United States Patent

[11] 3,573,779

| [72] | Inventors | Oliver H. McDaniel<br>Spruce Creek;<br>James H. Prout, State College, Pa. |
|------|-----------|------|
| [21] | Appl. No. | 714,248 |
| [22] | Filed | Mar. 19, 1968 |
| [45] | Patented | Apr. 6, 1971 |
| [73] | Assignee | The United States of America as represented by the Secretary of the Navy. |

[54] RECORD-LEVEL INDICATOR
5 Claims, 1 Drawing Fig.

[52] U.S. Cl. .................................................. 340/248, 179/100.2
[51] Int. Cl. .......................................................... G08b 21/00
[50] Field of Search .......................................... 340/248, 253, 331, 213; 328/207, 197; 179/100.2 (B)

[56] References Cited
UNITED STATES PATENTS

| 3,170,689 | 2/1965 | Brown et al. ................... | 340/248UX |
| 3,341,816 | 9/1967 | Davis et al. ................... | 340/248X |

Primary Examiner—Alvin H. Waring
Assistant Examiner—Daniel Myer
Attorneys—J. O. Tresansky, R. S. Sciascia and J. A. Cooke ABSTRACT: A device for monitoring input levels to a tape recorder having two channels fed by a common input. At a preset peak input level in each channel, an indicator light is triggered. The triggering is accomplished by direct-coupling a voltage amplifier to a Schmitt trigger. When recording, at the proper input level, one channel is adjusted so that its indicator is displaying while the other channel is adjusted so its indicator is not displaying.

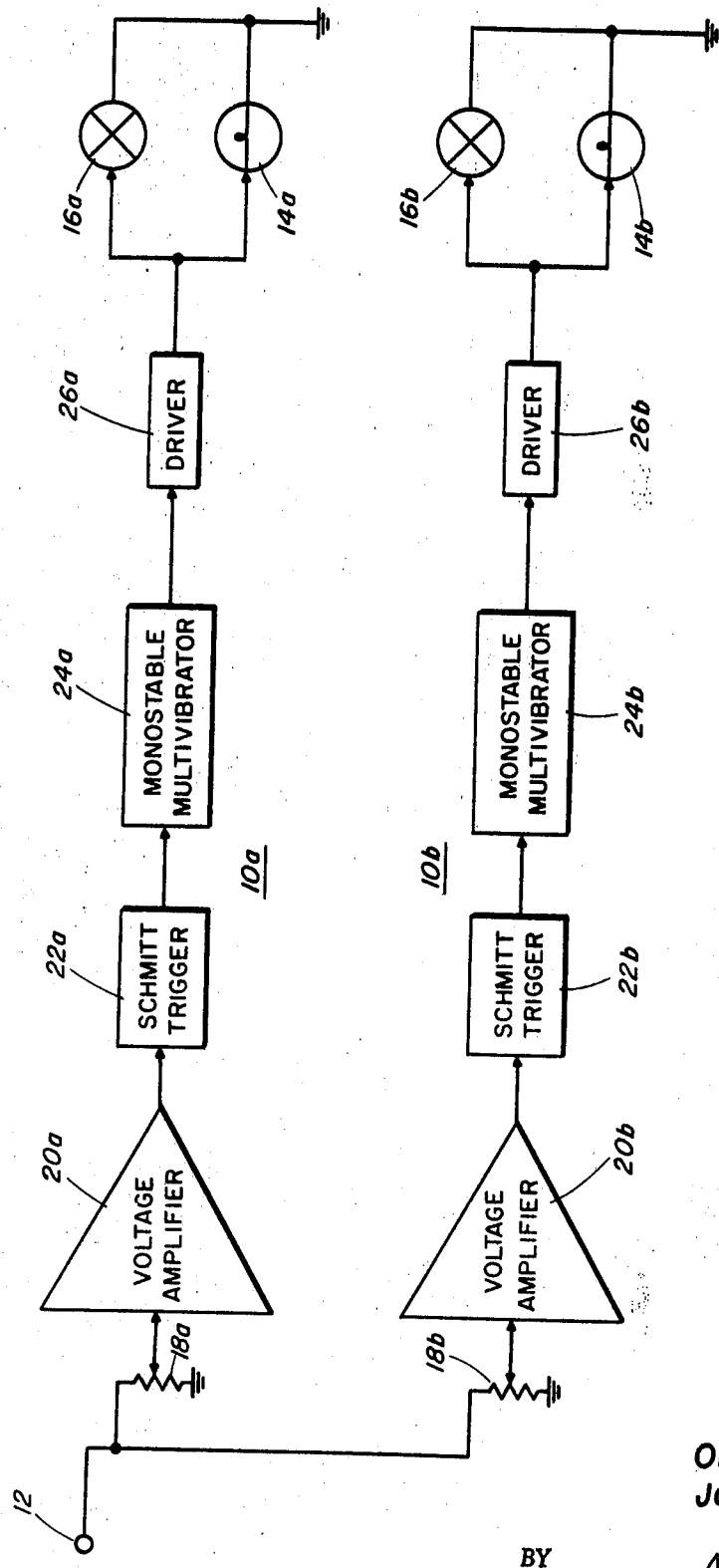

RECORD-LEVEL INDICATOR

BACKGROUND OF THE INVENTION

This invention relates generally to record-level monitoring devices and more particularly to a record-level monitoring device for the tape recording of repetitive transients.

The conventional VU meter does not perform entirely satisfactorily as a record-level monitoring device for tape recording of repetitive transients such as tone bursts or certain types of impact noise in that it does not respond to short voltage peaks. One can be assured of an undistorted recording only by monitoring the true peak voltage level at the input of the tape recorder. This can be accomplished by continuous observation of a calibrated oscilloscope; however, this method is difficult, time consuming, and, quite tedious, particularly for short duration high frequency phenomena.

SUMMARY OF THE INVENTION

Accordingly, one object of this invention is to provide a new and improved record-level monitoring device.

Another object of the subject invention is the provision of a new and improved record-level monitoring device for the tape recording of repetitive transients.

Still another object of the present invention is to provide a record-level visual indicating device which allows for continuous, accurate, and automatic operation.

A still further object of the invention is the provision of a new and improved record-level indicating unit which has an exceptionally wideband frequency response.

Another still further object of the instant invention is to provide a new and improved record-level monitor for the tape recording of repetitive transients regardless of the duration of the transient.

One other object of this invention is the provision of a novel record-level indicator which will operate for continuous signals.

Briefly, in accordance with the preferred embodiment of this invention, these and other objects are attained by connecting a pair of coupled peak voltage responsive channels to a suitable point in the record electronics of a tape recorder. One of the pair of channels (overload) is adjusted to trigger at the maximum peak recording level of the recorder and the other of the pair of channels (in-range) is adjusted to trigger at 6 to 10 db below the maximum peak level. When recording at the proper input level the in-range channel will display, while the overload channel does not display.

BRIEF DESCRIPTION OF THE DRAWING

A more complete appreciation of the invention and many of the attendant advantages thereof will be readily apparent as the same becomes better understood by reference to the following detailed description when considered in connection with the accompanying solitary view which illustrates a block diagram of the record-level indicator according to the present invention.

DETAILED DESCRIPTION OF THE PREFERRED EMBODIMENT

Referring now to the drawing, the device is shown as consisting essentially of a pair of parallel channels; namely, a first channel 10a and a second channel 10b which are simultaneously fed from a common input 12.

The operation of the first channel 10a and second channel 10b is accomplished by direct coupling in each channel through a respective resistor 18a and 18b a respective conventional voltage amplifier 20a and 20b to a respective conventional Schmitt trigger circuit 22a and 22b which performs the function of a peak-amplitude voltage detector. The trigger threshold of the Schmitt trigger 22a and 22b is respectively determined by the voltage amplifier gain of amplifier 20a and 20b. When the Schmitt trigger fires, it in turn triggers a conventional monostable multivibrator 24a and 24b which, through a conventional Darlington amplifier 26a and 26b drives a respective display which is more fully explained hereinafter. The respective displays in each of the parallel channels consist of a respective indicator light 14a and 14b such for example as a conventional pilot light, and/or a respective conventional visual annunciator 16a and 16b which will turn on for approximately one-half second and then automatically reset. The one-half second display will occur regardless of the duration of the input pulse at terminal 12.

It should be understood that the use of a pilot light alone for the display is sufficient for most applications; however, the addition of the annunciator allows the device to be used in bright sunlight where a pilot light is not visible. It should further be understood that the display time is determined by the timing capacitor of the monostable multivibrator 24a and 24b and may be set for any desired display time.

In the normal operation of the record-level indicator, the input 12 of the unit is connected to a suitable point in the record electronics of a tape recorder. The second channel 10b, designated as the "overload" channel, is adjusted to trigger at the maximum peak recording level of the tape recorder and the first channel 10a, designated as the "in-range" channel, is adjusted to trigger at approximately 6 to 10 db below the maximum peak level. In one particular application of the record-level indicator; namely, the recording of repetitive transients, such for example as sonar pulses, the system gain is adjusted so that the display devices 14a and 16a of the in-range channel 10a are blinking in synchronism with the sonar signal and the display devices 14b and 16b of the overload channel 10b are not indicating.

The indicator device has a frequency response of $\pm\frac{1}{2}$ db from 10 Hz. to 100 kHz. and its operation is independent of the duration of the transient if it falls within the 10 Hz. to 100 kHz. bandwidth and will even display for a signal of only one cycle duration. One is therefore assured that no peaks are recorded in an overload condition provided that the overload indicators do not display.

It should be apparent that the apparatus of the herein described invention allows for the automatic, accurate and continuous monitoring of the input levels to a tape recorder during the recording of repetitive transients. It should also be apparent that the invention is not so limited and may be used to monitor the level of continuous signals. Moreover, while only a single record-level indicator unit has been described, it will be readily apparent that any number of such units may be used in a single system.

Obviously, numerous modifications and variations of the present invention are possible in light of the above teachings. It is therefore to be understood that within the scope of the appended claims the invention may be practiced otherwise than as specifically described herein.

We claim:

1. A record-level indicator unit comprising:
    a first channel for receiving an input signal and including a Schmitt trigger for responding to a preset voltage level, a voltage amplifier for coupling said input signal to said Schmitt trigger, and a potentiometer for direct coupling said input signal to said voltage amplifier;
    a second channel separate and distinct from said first channel for receiving said input signal and including a Schmitt trigger for responding to a preset voltage level differing from said preset voltage level of said first channel, a voltage amplifier for coupling said input signal to said Schmitt trigger, and a potentiometer for direct coupling said input signal to said voltage amplifier;
    means in said first channel for indicating whether said preset level of said first channel has been reached;
    means in said second channel for indicating whether said preset level of said second channel has been reached;
    amplifier means in said first channel for driving said indicating means when said preset level of said first channel has been reached;

amplifier means in said second channel for driving said indicating means when said preset level of said second channel has been reached;

means in said first channel for automatically resetting after a predetermined time said first channel indicating means if said preset voltage of said first channel has been reached; and means in said second channel for automatically resetting after a predetermined time said second channel indicating means if said preset voltage of said second channel has been reached.

2. A record level indicator unit as in claim 1 wherein said means for indicating includes a pilot light.

3. A record level indicator unit as in claim 3 wherein said means for indicating further includes an annunciator.

4. A record-level indicator unit as in claim 1 wherein said means for automatically resetting is a monostable multivibrator and wherein said predetermined time is set by the timing capacitor of said monostable multivibrator.

5. A device for monitoring input levels to a tape recorder during the recording of repetitive transients comprising:

a first channel for receiving an input signal from a suitable point in the record electronics of said tape recorder and for responding to a preset voltage level, said first channel including a Schmitt trigger for responding to said preset voltage level, a voltage amplifier for coupling said input signal to said Schmitt trigger, and a potentiometer for direct coupling said input signal to said Schmitt trigger via said voltage amplifier;

a second channel separate and distinct from said first channel for receiving said aforementioned input signal and for responding to a preset voltage level differing from said preset level of said first channel, said second channel including a Schmitt trigger for responding to said differing preset voltage level, a voltage amplifier for coupling said input signal to said Schmitt trigger, and a potentiometer for direct coupling said input signal to said Schmitt trigger via said voltage amplifier;

separate and distinct indicating means connected to said first channel and said second channel, respectively, for visually indicating whether the preset levels of said first and of said second channels have been reached, respectively;

separate and distinct amplifier means connected to said first channel and said second channel, respectively, for driving said indicating means; and separate and distinct monostable multivibrators connected between said Schmitt trigger and said driver means of said first channel and said second channel for automatically resetting after a predetermined time said first channel indicating means and said second channel indicating means, respectively, when each has reached its preset voltage level whereby said transient signals are continuously and accurately recorded.